United States Patent
Dibbern, Jr. et al.

(10) Patent No.: US 6,609,442 B2
(45) Date of Patent: Aug. 26, 2003

(54) CHOP SAW

(75) Inventors: John E. Dibbern, Jr., Street, MD (US); Daniel L. Krout, New Freedom, PA (US); Daniel H. Montague, New Freedom, PA (US); Robert P. Welsh, Hunt Valley, MD (US)

(73) Assignee: Black & Decker Inc., Newark, DE (US)

( * ) Notice: Subject to any disclaimer, the term of this patent is extended or adjusted under 35 U.S.C. 154(b) by 9 days.

(21) Appl. No.: 09/804,331

(22) Filed: Mar. 12, 2001

(65) Prior Publication Data

US 2001/0008098 A1 Jul. 19, 2001

Related U.S. Application Data

(63) Continuation of application No. 09/115,253, filed on Jul. 13, 1998.

(51) Int. Cl.[7] .................................................. B26D 3/00
(52) U.S. Cl. ...................... 76/112; 83/508.2; 83/477.1; 83/698.51
(58) Field of Search .............................. 76/112; 83/490, 83/473, 471.3, 508.2, 477.1, 698.51, 13

(56) References Cited

U.S. PATENT DOCUMENTS

| | | | | |
|---|---|---|---|---|
| 2,435,156 A | * | 1/1948 | Pealer ........................ 83/490 |
| 2,496,716 A | * | 2/1950 | Hanna ........................ 83/473 |
| 3,151,641 A | * | 10/1964 | Kimmel et al. ............... 83/473 |
| 3,888,152 A | * | 6/1975 | Barton ....................... 83/471.3 |
| 4,587,875 A | * | 5/1986 | Deley ....................... 83/471.3 |
| 5,161,443 A | * | 11/1992 | Huang ........................ 83/171 |
| 5,355,635 A | * | 10/1994 | Sasaki et al. ................. 83/490 |

* cited by examiner

Primary Examiner—Kenneth E. Peterson
Assistant Examiner—Omar Flores-Sánchez
(74) Attorney, Agent, or Firm—Adan Ayala

(57) ABSTRACT

An improved chop saw may include a base assembly, a blade assembly including a blade having a center and a motor for driving the blade, an arm pivotally attached to the base assembly and carrying the blade assembly, the blade assembly being movable between a lower position for engaging and cutting a workpiece disposed on the base, and an upper position not engaging the workpiece. The chop saw further includes a vise for holding the workpiece in place, the vise including a vise screw, a latch support supporting the vise screw, and a vise jaw disposed at the end of the vise screw. Preferably, the maximum distance between the vise jaw and the latch support is about equal or shorter than the distance between the blade center and the latch support, when the blade assembly is at the lower position. Further the chop saw includes a substantially horizontal handle connected to the blade assembly. Preferably, the handle is slightly curved, with the centerpoint of the curvature being disposed below the handle and towards the base.

7 Claims, 4 Drawing Sheets

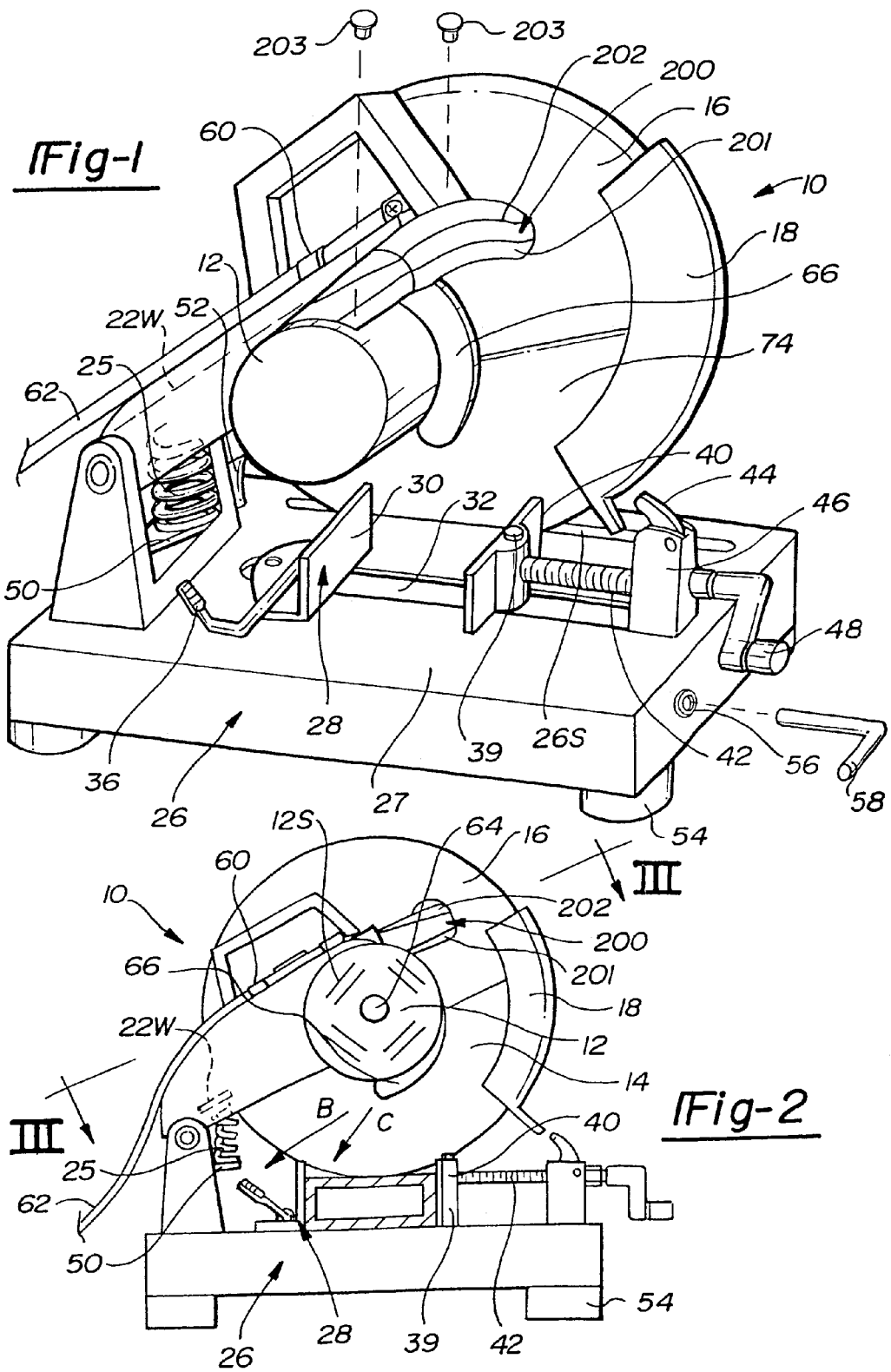

CHOP SAW

This application is a continuation of application Ser. No. 09/115,253 filed Jul. 13, 1998.

FIELD OF THE INVENTION

This invention relates generally to chop saws and methods for manufacturing same.

BACKGROUND OF THE INVENTION

A chop saw is a power tool which may be used to cut off pieces of metal from items like angle iron and pipe, and is frequently found at construction job sites. The chop saw usually includes a base, an arm pivotally mounted to the base, and carrying a motor field case, which contains a motor, which in turn drives a blade. A stationary guard may be disposed on the arm to cover a portion of the blade. Such blade assembly may be pivoted in a chopping action from a first position not engaging a workpiece disposed on the base to a second position engaging and cutting the workpiece.

A handle is disposed on the motor field case or the arm to allow the operator to conduct the chopping action. Typically, the handle has a substantially vertical orientation.

SUMMARY OF THE INVENTION

In accordance with the present invention, an improved chop saw is employed. The chop saw includes a base assembly, a blade assembly including a blade having a center and a motor for driving the blade, an arm pivotally attached to the base assembly and carrying the blade assembly, the blade assembly being movable between a lower position for engaging and cutting a workpiece disposed on the base, and an upper position not engaging the workpiece. The chop saw further includes a vise for holding the workpiece in place, the vise including a vise screw, a latch support supporting the vise screw, and a vise jaw disposed at the end of the vise screw. Preferably, the maximum distance between the vise jaw and the latch support is about equal or shorter than the distance between the blade center and the latch support, when the blade assembly is at the lower position. Further the chop saw includes a substantially horizontal handle connected to the blade assembly. Preferably, the handle is slightly curved, with the centerpoint of the curvature being disposed below the handle and towards the base.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 is a perspective view of a chop saw according to the present invention;

FIG. 2 is a side view of the chop saw of FIG. 1;

DETAILED DESCRIPTION

Figure 3:
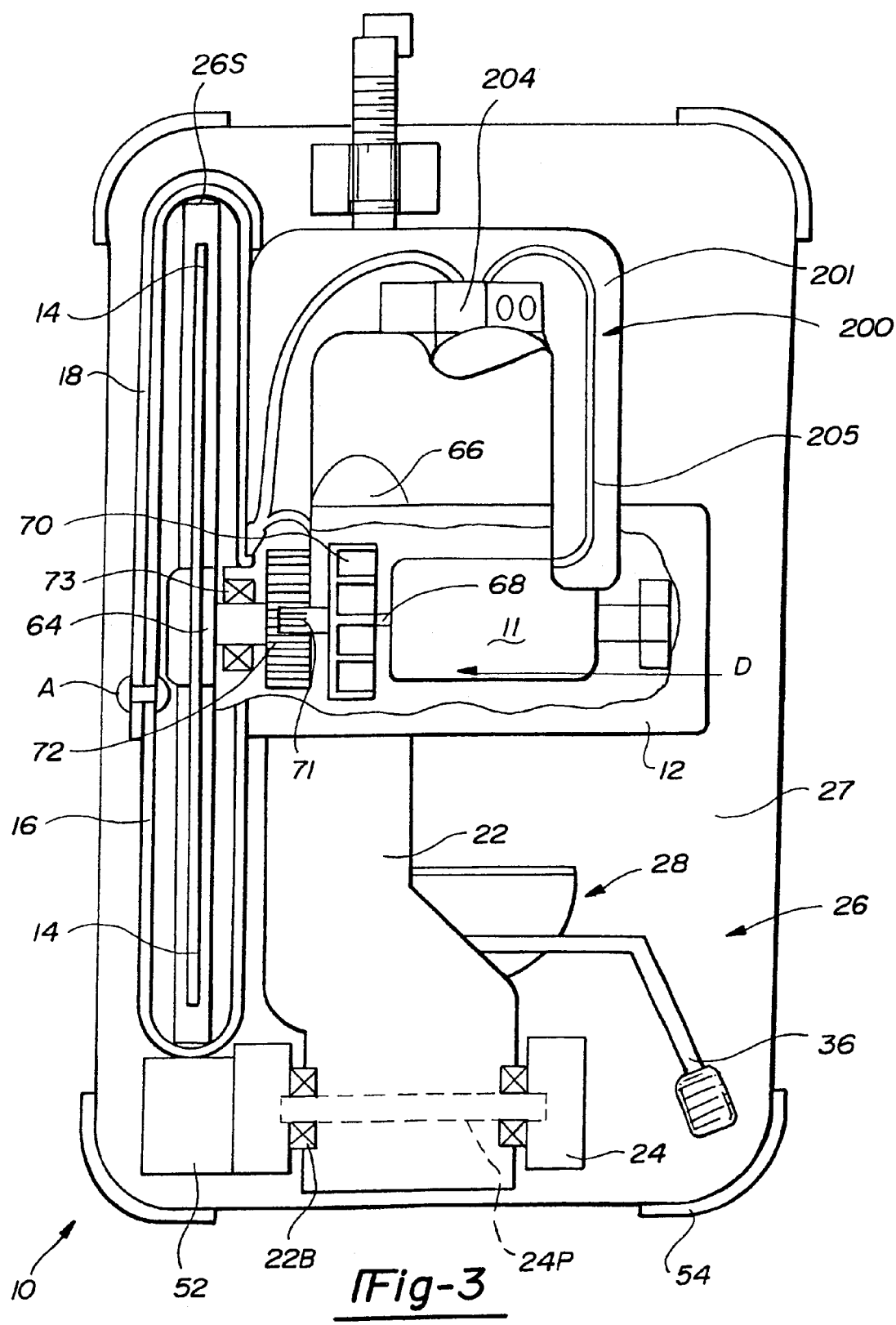
FIG. 3 is a partial top plan/cross-sectional view of the chop saw of FIG. 1 along line III—III in FIG. 2.

The invention is now described with reference to the accompanying figures, wherein like numerals designate like parts. Referring to FIG. 1, a power tool of the present invention is shown generally as 10, and in the preferred embodiment is referred to as a "chop saw."

Chop saw 10 includes a motor field case 12 containing a motor 11 (see FIG. 3) which drives a blade 14. A stationary guard 16 covers a portion of the blade 14. A movable guard 18 may telescope over the stationary guard 16, or preferably pivot about a point A (see FIG. 3), to expose blade 14 during a cutting operation.

A handle 200 is preferably mounted on motor field case 12 and/or arm 22. Preferably, handle 200 has a substantially horizontal orientation, as shown in FIGS. 1–3. Furthermore, handle 200 is preferably slightly curved, with the center point of the curvature preferably being below handle 200, i.e., the center point lies towards base 26. It has been found that such shape is both ergonomically correct and aesthetically pleasing. Nevertheless, persons skilled in the art shall recognize that handle 200 may be slightly curved, with the center point of the curvature preferably being above handle 200, i.e., the center point lies away from base 26.

Preferably handle 200 includes a lower portion 201 mounted on motor field case 12 (and/or arm 22), and an upper portion 202 fixedly attached to lower portion 201. Screws 203 may be used to attach upper portion 202 to lower portion 201. Having such construction is beneficial, as it allows for easier manufacturing of the chop saw 10, as well as servicing.

As shown in FIG. 3, once the lower portion 201 is mounted on motor field case 12, a switch 204 may be disposed on lower portion 201. Similarly, the different wires 205 may be connected between the switch 204, the motor 11, etc. Once all the wiring and mounting has been completed, the upper portion 202 can be installed on and attached to lower portion 201.

Mounting the handle 200 on the motor field case 12 also allows for easier wiring than typical prior art arrangements, as the wires can be fed directly through the motor field case 12 rather than a more circuitous way, e.g., through arm 22 only.

Referring to FIG. 1, the motor field case 12 is preferably connected to an arm 22. Arm 22 preferably also carries blade 14, and guards 16, 18. Arm 22 is pivotally mounted on an arm support 24, which is mounted on base 26. Preferably, a pivot rod 24P (see FIG. 3) is disposed between the arm support 24. Arm 22 is preferably pivotably disposed on pivot rod 24P, allowing the chopping action. Preferably, the arm 22 and/or arm support 24 may have at least one bearing 22B disposed about and/or supporting the pivot rod 24P for facilitating rotation thereabout. Accordingly, arm 22 may be moved between two positions: an upper position, where the blade 14 does not engage the workpiece, and a lower position, where the blade 14 engages and cuts the workpiece. Preferably, blade 14 may be plunged through a slot 26S on base 26.

Preferably bearings 22B are disposed between arm support 24 and arm 22 so that arm 22 and arm support 24 do not contact each other, reducing wear and tear. As shown in FIG. 3, such arrangement may be achieved by partly disposing bearings 22B within arm 22, so that bearings 22B extend beyond arm 22.

Bearings 22B may also be installed on arm 22 for facilitating the rotation of arm 22 about pivot rod 24P. Preferably, only bearings 22B, not arm 22, will contact pivot rod 24P. This arrangement is advantageous because it reduces wear and tear of the pivot rod 24P and/or arm 22. Otherwise, the wear and tear would create play between the two parts, both increasing inaccuracy and allowing dust to creep in between the parts. Because of the bearings, the wear and tear is minimal, optimizing accuracy and substantially increasing operating life.

Arm support 24 preferably has a forwardly-extending portion 50. Preferably portion 50 is fixedly attached to arm support 24, so that portion 50 does not move. A spring 25 is supported between portion 50 and an inner wall 22W of arm 22. Because the spring 25 is preferably an expansion spring (also known as a compression spring), arm 22 is normally biased towards the upward position by spring 25.

A chip deflector 52 may be mounted on base 26 and/or to arm support 24. Chip deflector 52 assists in directing the flow of chips resulting from the cutting operation.

Base 26 has a workpiece support (or work surface) 27. Fence subassembly 28 is preferably disposed on workpiece support 27. Preferably, an operator may slide and rotate fence subassembly 28 along workpiece support 27.

People skilled in the art are referred to U.S. Pat. No. 5,720,096, incorporated herein by reference, for a detailed description of the preferred embodiment of fence subassembly 28. Fence subassembly 28 includes a workpiece-engaging portion 30 which is guided along the base 26 via a slot formed in the work surface 27 (through-slot 32), as well as actuator 36, which the operator may rotate to lock or unlock the fence subassembly 28 as desired.

A vise jaw 40 co-acts with fence subassembly 28 to clamp a workpiece. The vise jaw 40 may rotate, to that a workpiece can be clamped in a desired angular orientation relative to blade 14. Preferably the fence subassembly 28 and vise jaw 40 can be rotated along their respective "Y" axes to achieve a desired angle such as, for example, 30° or 45°, so that the chop saw can make a miter cut. The vise jaw 40 may be advanced to a clamping position by rotation of vise screw 42. Preferably the axis of vise screw 42 is substantially parallel to the work surface 27. The vise jaw 40 preferably pivots about jaw bolt or pin 39, which is sized to slideably advance or retract along through-slot 32.

In other words, both fence subassembly 28 and vise jaw 40 may be disposed on the same through-slot 32. Preferably, both fence subassembly 28 and vise jaw 40 can travel along the entire length of through-slot 32. Nevertheless, persons skilled in the art shall recognize that fence subassembly 28 and vise jaw 40 may be disposed on different slots.

A vise latch 44 may be mounted in a conventional way on a latch support 46 to latch the vise screw 42 in its clamping position. The clamping force can be augmented by rotation of vise handle 48, which is fixedly connected to vise screw 42. Persons skilled in the art will recognize that the vise latch 44 may be disengaged to allow movement of the vise screw 42 towards fence subassembly 28, then engaged to latch the vise screw 42 in its clamping position.

It has been learned by the inventors of the present application that it is preferable to place the workpiece so that it is centered below the center of blade 14 or in front of the center of blade 14, i.e., towards the operator or vise latch 44, when the blade 14 is in the lower, cutting position. Accordingly, it is beneficial to provide a vise screw 42 shorter than that found in typical chop saws. Referring to FIGS. 1–2, the vise screw 42 should be short enough so that the maximum length between vise jaw 40 and latch support 46 is about equal or shorter than the distance from the center of blade, i.e., arbor 64, to latch support 46. Preferably the distance from arbor 64 to latch support 46 is measured when the blade 14 is in the lower, cutting position. By providing such shorter vise screw, as opposed to the typical long vise screw, the operator is forced to place the workpiece in a good cutting position. Further, such shorter vise screw requires less material for construction, lowering the cost of the overall tool.

Referring now to FIG. 1, base 26 may also have molded rubber feet 54 disposed thereon. Further, base 26 may have a rubber grommet 56, which receives a wrench 58.

Referring now to FIG. 3, motor 11 is contained within motor field case 12. Motor 11 has a drive shaft 68. A fan 70 is preferably disposed on the drive shaft 68. A primary gear 71 may be disposed at the end of the drive shaft 68, and may mesh with a secondary gear 72 disposed at the end of arbor shaft 64. It is preferable to provide gears 71, 72 to change the rotational speed of the blade 14. It is also preferable to dispose bearings 73 on motor field case 12 or arm 22 to support arbor shaft 64.

Figure 5:
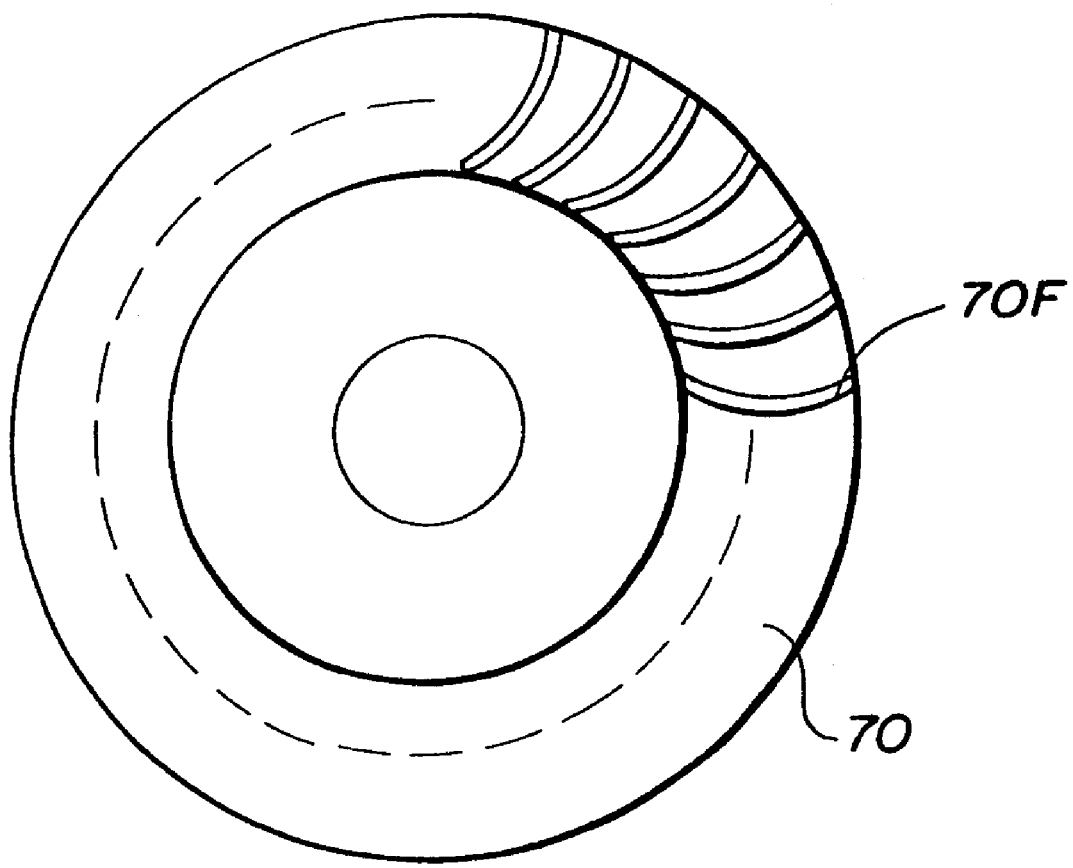
FIG. 5 is a partial front view of a motor fan preferably used in the chop saw of FIG. 1.

By providing a fan 70 on the drive shaft 68, air is brought into the motor field case 12 through slots 12S (FIG. 2) along direction D to cool motor 11. The air can then exit via exhaust 66. Preferably exhaust 66 is shaped so that air will travel along directions B and/or C (FIG. 2), cooling and/or direction the chips resulting from the cutting operation towards the rear of the chop saw 10. Preferably fan 70 is a radial fan as shown in FIG. 5, where the fins 70F are disposed in a generally radial direction. Fins 70F may also be curved to further direct the air.

Slots (not shown) may also be disposed on the arm 22 between the fan 70 and blade 14, allowing air to travel along the motor axis and towards blade 14. Such air flow also contributes towards cooling the blade 14.

Figure 4A:
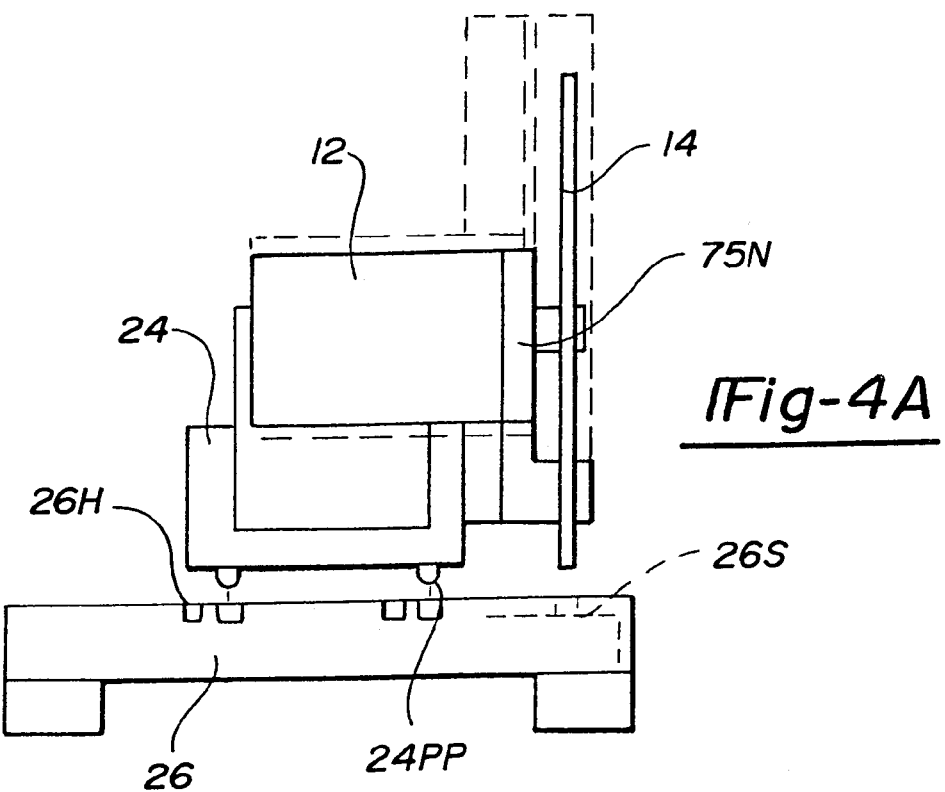
FIGS. 4A and 4B illustrate an assembly step for manufacturing a chop saw according to the present invention.
Figure 4B:
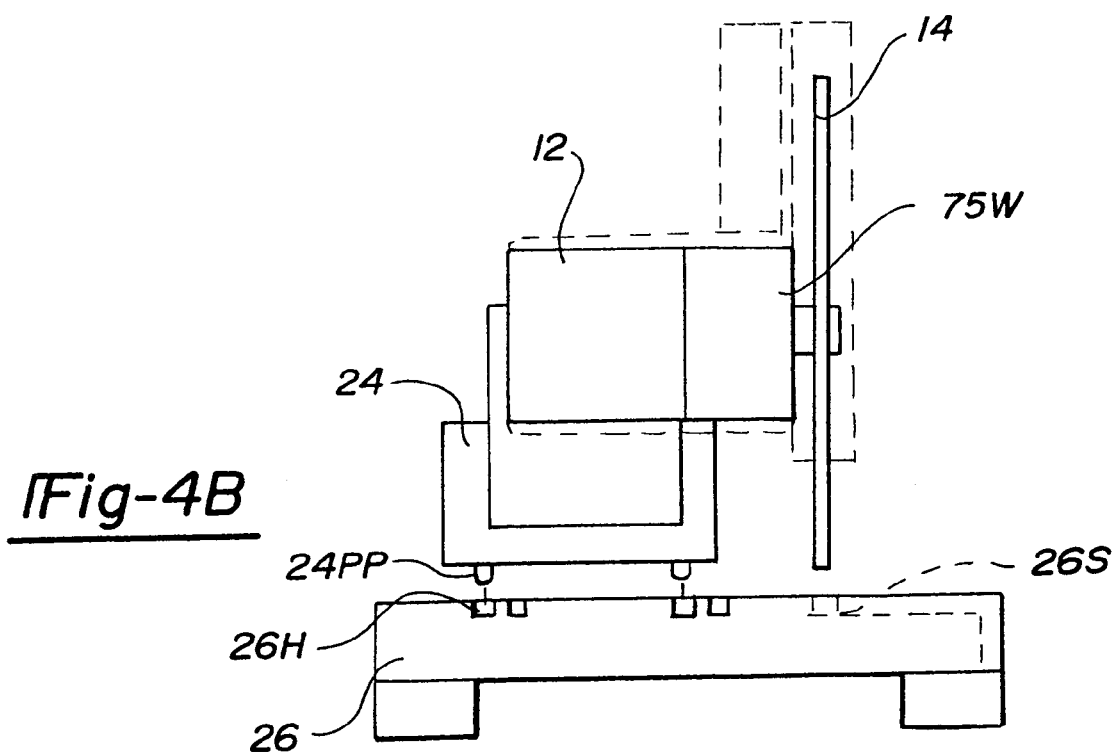

Because different gears 71, 72 may be used to provide a different cutting speed or to accommodate different motors, the gears may have different widths and/or sizes. If those gears were to be installed, the blade 14 may be so offset that blade 14 cannot be plunged through slot 26S. However, by shifting the position of arm support 24, and thus of arm 22 and blade 14, blade 14 can properly be placed so that it can be plunged through slot 26S. In other words, referring now to FIGS. 4A–4B, if narrow gears, or a narrow gear case 75N, for example, are installed, the arm support 24 may be positioned closer to blade slot 26S. If wider or additional gears or gear sets, or a wide gear case 75W, are installed, the arm support 24 may be positioned farther from blade slot 26S.

Accordingly, arm support 24 may be provided with positioning pins 24PP. Positioning holes 26H may be disposed on base 26 in predetermined positions so that, if a certain type of gear or gear case is installed, the person assembling the chop saw need only place the positioning pins 24PP of arm support 26 in the appropriate positioning holes 26H. Persons skilled in the art should recognize that the scope of the invention covers the alternative embodiment where the base 26 is provided with positioning pins while arm support 24 is provided with positioning holes.

Such positioning holes 26H and positioning pins 24PP may also be used as reference points for determining the exact position of other features in arm support 24 and base 26 during construction. For example, based on the position of the pins 24PP, the exact location of holes for receiving the pivot rod 24P in the arm support 24 can be established. A person can then exactly machine the holes. Such exact construction helps in reducing alignment problems caused by tolerance variances, and thus substantially improves the accuracy of the tool. Based on the positioning pins 24PP, a person can also determine how much material to remove from the bottom of the arm support 24.

Similarly, using the positioning holes 26H as reference points, different features, such as the through-slot 32, the blade slot 26S, and angle indicia interacting with fence subassembly 28, can be exactly positioned on base 26. Such exact construction helps in reducing alignment problems caused by tolerance variances, and thus substantially improves the accuracy of the tool.

Persons skilled in the art may recognize other alternatives or additions to the means disclosed herein, such as disposing tabs 60 on arm 22 in order to maintain the power cord 62 in place. However, all these additions and/or alterations are considered to be equivalents of the present invention.

What is claimed is:

1. A method for manufacturing a saw comprising a base assembly, an arm support disposed on the base assembly, an arm pivotably attached to the arm support, and a blade assembly carried by the arm, the blade assembly comprising a blade having a center, a motor for driving the blade, and at least one gearset disposed between the motor and the blade, the method comprising the steps of:

selecting a gearset from a plurality of gearset having different widths;

providing at least one positioning pin on one of the arm support and the base assembly;

providing at least two positioning holes on the other of the arm support and the base assembly, there being more positioning holes than are positioning pins;

disposing the at least one positioning pin on one of the at least two positioning holes depending on which gearset is selected in order to properly placed said blade so that said blade can be plunged through at least one slot located on the said base assembly.

2. The method of claim 1, wherein the positioning pin is disposed on the arm support and the at least two positioning holes are disposed on the base assembly.

3. The method of claim 1, further comprising the step of positioning at least one feature on the base assembly based on position of the positioning pin or of at least one, of the positioning holes disposed on the base assembly.

4. The method of claim 1, wherein the arm support comprises at least one rod receiving hole for receiving the pivot rod.

5. The method of claim 4, further comprising the step of positioning the at least one rod receiving hole on the arm support based on position of the positioning pin or of at least one of the positioning holes disposed on the arm support.

6. A method for manufacturing a saw comprising a base assembly, an arm support disposed on the base assembly, an arm pivotably attached to the arm support, and a blade assembly carried by the arm, the blade assembly comprising a blade having a center and a motor for driving the blade, and at least one gearset disposed between the motor and the blade, the method comprising the steps of:

selecting a gearset from a plurality of gearset having different widths;

providing at least one positioning pin on one of the arm support and the base assembly;

providing at least two positioning holes on the other of the arm support and the base assembly, there being more positioning holes than are positioning pins;

disposing the at least one positioning pin on one of the at least two positioning holes depending on which gearset is selected in order to properly placed said blade so that said blade can be plunged through at least one slot located on the said base assembly;

positioning at least one feature on the base assembly based on position of the positioning pin or of at least one of the positioning holes disposed on the base assembly.

7. The method of claim 6, wherein the positioning pin is disposed on the arm support and the at least two positioning holes are disposed on the base assembly.

* * * * *